(12) United States Patent
Graylin

(10) Patent No.: US 8,498,425 B2
(45) Date of Patent: Jul. 30, 2013

(54) WEARABLE HEADSET WITH SELF-CONTAINED VOCAL FEEDBACK AND VOCAL COMMAND

(75) Inventor: Will Wang Graylin, Saugus, MA (US)

(73) Assignee: Onvocal Inc, Saugus, MA (US)

( * ) Notice: Subject to any disclaimer, the term of this patent is extended or adjusted under 35 U.S.C. 154(b) by 516 days.

(21) Appl. No.: 12/539,009

(22) Filed: Aug. 11, 2009

(65) Prior Publication Data

US 2010/0041447 A1 Feb. 18, 2010

Related U.S. Application Data

(60) Provisional application No. 61/088,417, filed on Aug. 13, 2008, provisional application No. 61/149,372, filed on Feb. 3, 2009.

(51) Int. Cl.
*H04R 1/00* (2006.01)
(52) U.S. Cl.
USPC ............. 381/74; 381/110; 381/370; 381/119; 381/361; 381/362; 84/625; 84/660
(58) Field of Classification Search
USPC ................. 381/110, 361–362, 367, 364, 370, 381/376, 119, 74; 704/246, E17, 2; 84/625, 84/660
See application file for complete search history.

(56) References Cited

U.S. PATENT DOCUMENTS

| | | | |
|---|---|---|---|
| 5,457,751 A | 10/1995 | Such | |
| 5,894,523 A | 4/1999 | Freeman | |
| 6,339,706 B1 | 1/2002 | Tillgren et al. | |
| 7,346,175 B2 | 3/2008 | Hui et al. | |
| 7,463,245 B2 | 12/2008 | Marcus et al. | |
| 7,706,553 B2* | 4/2010 | Brown | 381/110 |
| 8,073,137 B2* | 12/2011 | Weinans et al. | 379/433.06 |
| 2002/0189429 A1* | 12/2002 | Qian et al. | 84/610 |
| 2003/0119575 A1 | 6/2003 | Centuori et al. | |
| 2003/0130852 A1 | 7/2003 | Tanaka | |
| 2004/0203351 A1 | 10/2004 | Shearer et al. | |
| 2005/0053255 A1 | 3/2005 | Harris et al. | |
| 2005/0186993 A1 | 8/2005 | Yueh | |
| 2005/0244027 A1 | 11/2005 | Kaulfuss et al. | |
| 2006/0025074 A1 | 2/2006 | Liang | |

(Continued)

FOREIGN PATENT DOCUMENTS

| | | | |
|---|---|---|---|
| AU | WO2008058327 A1 | 5/2008 | |
| KR | 200356416 Y1 | 7/2004 | |

(Continued)

*Primary Examiner* — Disler Paul
(74) *Attorney, Agent, or Firm* — AKC Patents LLC; Aliki K. Collins

(57) ABSTRACT

A headset includes a wearable body, first and second earphones extending from the wearable body, controls for controlling an external communication/multimedia device wirelessly, a microphone for picking up vocal data from a user of the headset system and a signal processing unit. The signal processing unit includes circuitry for processing the vocal data into a distinctly audible vocal feedback signal, circuitry for enhancing the vocal feedback signal thereby producing an enhanced vocal feedback signal and circuitry for mixing the enhanced vocal feedback signal with audio signals originating from the external communication/multimedia device, thereby producing a mixed output signal and then sending the mixed output signal to the user via the earphones. The external communication/multimedia device comprises a vocal command application and the headset further comprises a vocal command control for sending vocal commands to the external communication/multimedia device and to the vocal command application.

16 Claims, 4 Drawing Sheets

U.S. PATENT DOCUMENTS

| | | |
|---|---|---|
| 2006/0046656 A1 | 3/2006 | Yang |
| 2006/0062417 A1 | 3/2006 | Tachikawa |
| 2006/0210058 A1 | 9/2006 | Kock et al. |
| 2006/0286932 A1 | 12/2006 | Sakhpara |
| 2007/0080186 A1 | 4/2007 | deLeon et al. |
| 2007/0161403 A1 | 7/2007 | Cheng et al. |
| 2007/0263879 A1 | 11/2007 | Trip et al. |
| 2008/0058023 A1 | 3/2008 | Seshadri et al. |
| 2008/0103780 A1 | 5/2008 | Dacostan |
| 2008/0144854 A1* | 6/2008 | Abreu .............. 381/74 |
| 2008/0146283 A1* | 6/2008 | Rao et al. ............ 455/565 |
| 2008/0184870 A1* | 8/2008 | Toivola ............ 84/610 |
| 2008/0253583 A1* | 10/2008 | Goldstein et al. ....... 381/92 |

FOREIGN PATENT DOCUMENTS

| | | |
|---|---|---|
| WO | 0137262 A1 | 5/2001 |
| WO | 2005043508 A2 | 5/2005 |
| WO | WO2008058327 A1 | 5/2008 |
| WO | 2008137499 A1 | 11/2008 |

\* cited by examiner

WEARABLE HEADSET WITH SELF-CONTAINED VOCAL FEEDBACK AND VOCAL COMMAND

CROSS REFERENCE TO RELATED CO-PENDING APPLICATIONS

This application claims the benefit of U.S. provisional application Ser. No. 61/088,417 filed on Aug. 13, 2008 and entitled WEARABLE HEADSET WITH SELF-CONTAINED VOCAL FEEDBACK, which is commonly assigned, and the contents of which are expressly incorporated herein by reference.

This application claims also the benefit of U.S. provisional application Ser. No. 61/149,372 filed on Feb. 3, 2009 and entitled WEARABLE HEADSET WITH SELF-CONTAINED VOCAL FEEDBACK AND VOCAL COMMAND, which is commonly assigned, and the contents of which are expressly incorporated herein by reference.

FIELD OF THE INVENTION

The present invention relates to a wearable headset and in particular to a wearable stereo headset with self contained vocal feedback and vocal command.

BACKGROUND OF THE INVENTION

Headsets or headphones are typically used in connection with communication and multimedia devices in order to listen to audio signals produced by or transferred from these devices. Examples of such communication and multimedia devices include mobile phones, radio receivers, portable music players like CD players and MP3 players.

SUMMARY OF THE INVENTION

The present invention relates to a wearable wireless headset and in particular to a wearable stereo wireless headset with focused vocal feedback and vocal command of the user wearing the device. The invention is designed to focus the microphone on the user's vocal frequency spectrum and to provide real-time (zero time delay) distinctly audible feedback to the user so that he can adjust his own vocal volume, pitch, tone and ambient environment noise, among others, accordingly. The invention also includes a vocal command button for capturing and transferring voice stream data wirelessly to a communication/multimedia device, for voice to text recognition, voice application control, and voice authentication. The voice stream data are executed by a vocal command application located on the communication/multimedia device or on a remote server to which the device is connected either via a wired or a wireless connection. The invention may be used for interacting with and controlling various mobile device functions including controlling phone calls and music player, and other devices with Bluetooth or adaptors to Bluetooth. The invention provides valuable vocal feedback of the user to enhanced his/her experience in making phone calls for more clear and accurate conversations with either humans or computer voice recognition systems. The invention may also be used for entertainment or music training by providing accurate vocal feedback to a singer, or in leisure to someone who wants to karaoke with the songs he/she is listening to. The invention may also be used in connection with learning languages, to help the learner with vocal feedback in practicing with audio training material. The invention focuses on the vocals only and cuts away ambient noise and therefore can also be used widely for more accurate voice dictation and voice commands in conjunction with other mobile devices, PCs, video games and other interactive devices. The invention may be connected to any device with synchronized wireless transmission such as Bluetooth. It may also be connected directly via a standard stereo jack, or stereo jack with microphone support to many mobile phones. Most applications would be connected with other Bluetooth enabled devices, or via Bluetooth adapted devices.

In general, in one aspect, the invention features a headset including a wearable body, first and second earphones extending from the wearable body, controls for controlling an external communication/multimedia device wirelessly, a microphone for picking up vocal data from a user of the headset system and a signal processing unit. The signal processing unit includes circuitry for processing the vocal data into a distinctly audible vocal feedback signal, circuitry for enhancing the vocal feedback signal thereby producing an enhanced vocal feedback signal and circuitry for mixing the enhanced vocal feedback signal with audio signals originating from the external communication/multimedia device, thereby producing a mixed output signal and then sending the mixed output signal to the user via the earphones.

Implementations of this aspect of the invention may include one or more of the following features. The external communication/multimedia device comprises a vocal command application and the headset further comprises a vocal command control for sending vocal commands to the external communication/multimedia device and to the vocal command application. The wearable body is configured to be worn around the back of the user's neck and comprises bendable and flexible material. The wearable body comprises a U-shaped frame that conforms to the back of the user's neck and includes first and second ends and the microphone extends from one of the U-shaped frame ends. The U-shaped frame is foldable and comprises adjustable length. The first and second earphones are contained and concealed within first and second openings in the first and second ends of the U-shaped frame, respectively. The earphones are pulled out from the openings when in use and retract back into the openings when not in use. The external communication/multimedia device may be a mobile phone, MP3 player, portable music player, personal digital assistant, personal computer, or television set. The signal processing unit is contained within the U-shaped frame and comprises an interface, a signal processor, filters, a mixer, a battery, and a recorder. During operation the headset communicates with and sends and receives data to and from the external communication/multimedia device via the interface. The interface comprises a wireless interface and the wireless interface may be a Bluetooth interface. The enhancement circuitry comprises filters for enhancing the user's vocal frequencies, filters for reducing ambient noise and controls for adjusting the volume of the enhanced vocal feedback signal relative to the volume of the audio signals originating from the communication/multimedia device. Activating and holding the vocal command control on sends a vocal command activation signal from the headset to the external communication/multimedia device, wakes up the vocal command application and sends voice data to the vocal command application via the interface. The vocal command application comprises means for converting the voice data into text or pattern, locally or remotely via a server. The vocal command application further translates the text or pattern into commands that perform one or more functions by the vocal command application and other applications on the external communication/multimedia device. The signal processing unit further comprises a recorder and upon waking up of the vocal command application, a first alert tone is sent to the earphones indicating that recording of voice data in the recorder has commenced. Releasing of the vocal command control stops the recording and then sends a second alert tone to the earphones indicating that the recording is stopped.

In general, in another aspect, the invention features a system comprising a headset and a communication/multimedia device. The headset communicates with the communication/multimedia device wirelessly and includes a wearable body, first and second earphones extending from the wearable body, controls for controlling the external communication/multimedia device wirelessly, a microphone for picking up vocal data from a user of the headset, a signal processing unit and a vocal command control. The external communication/multimedia device comprises a vocal command application and the vocal command control sends vocal commands to the external communication/multimedia device and to the vocal command application.

Implementations of this aspect of the invention may include one or more of the following features. The signal processing unit includes circuitry for processing the vocal data into a vocal feedback signal, circuitry for enhancing the vocal feedback signal thereby producing an enhanced vocal feedback signal and circuitry for mixing the enhanced vocal feedback signal with audio signals originating from the external communication/multimedia device, thereby producing a mixed output signal and then sending the mixed output signal to the user via the earphones. The system may further include a remote server and the communication/multimedia device comprises means for communicating with and sending the vocal commands voice data to the remote server via a network and the server comprises means for converting voice data contained in the vocal commands into text or pattern and then return the text or pattern back to the vocal command application for executing commands translated from the text or pattern. The external communication/multimedia device further comprises a voice recognition application and the voice recognition application receives voice data from the headset and converts them into text or pattern. The vocal command application translates the text or pattern into commands that perform one or more functions by the vocal command application and other applications on the external communication/multimedia device. The remote server comprises an authentication application for recognizing and authenticating the user from the voice data. The commands may be "call a person", "e-mail a person", "search a content", "text a person" or "Goto a location" based on Global Positioning System (GPS).

In general, in another aspect, the invention features a method for issuing vocal commands to a communication/multimedia device via a headset. The method includes the following steps. First, providing a headset comprising a wearable body, first and second ear phones extending from the wearable body, controls for controlling the external communication/multimedia device wirelessly, a microphone for picking up vocal data from a user of the headset, a signal processing unit and vocal command control for sending voice data to the communication/multimedia device. Next, activating the communication/multimedia device's vocal command mode by turning and holding the vocal command control on. Next, sending a wake-up signal to the communication/multimedia device via an interface of the headset for waking up a vocal command application (VCA) and begin recording of vocal command data. Upon start of recording of voice command, sending a first alert sound to the earphones indicating that recording of voice data has commenced. Next, speaking voice commands into the microphone and recording the captured voice data. Next, releasing the vocal command control, thereby stopping the recording of the captured voice data and sending a second alert sound to the earphones indicating that recording of voice data has stopped. The voice data can be sent to the VCA as a stream while recording continues or as a block of data after recording stops. Finally, sending the recorded voice data to the communication/multimedia device and the VCA for processing. Alternatively, the recorded data are sent by the VCA to a remote server via the communication/multimedia device for further processing. The processing of the recorded voice data by the VCA or the remote server includes applying voice recognition software and converting the voice data into text or pattern and executing commands contained in the voice data by the VCA. The signal processing unit may comprise circuitry for processing the vocal data into a vocal feedback signal, circuitry for enhancing the vocal feedback signal thereby producing an enhanced vocal feedback signal and circuitry for mixing the enhanced vocal feedback signal with audio signals originating from the external communications/multimedia device, thereby producing a mixed output signal and then sending the mixed output signal to the user via the earphones.

DETAILED DESCRIPTION OF THE INVENTION

Figure 1:
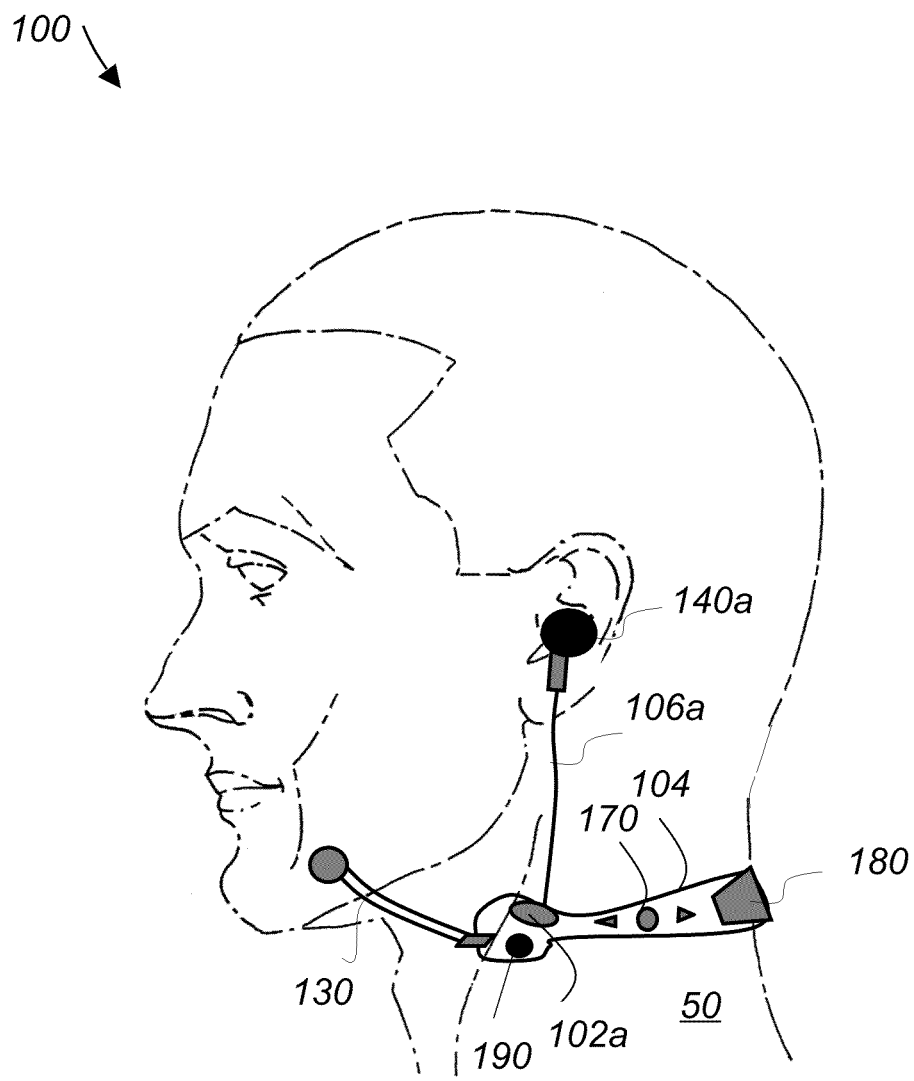
FIG. 1 depicts a headset according to this invention worn by a user.

The ability to hear one's own vocals accurately is critical to musicians performing well. This is why feedback is set up for the musician either by speakers in front of them, or via headsets, or earpieces. Microphones to localize and amplify the vocals of a singer through the feedback systems allow for accurate pitch control, volume control and tone control by the singer. While professional musicians take great care in setting up systems that enhance their vocal "output" for their audiences receiving their "input", there is no feedback control for general consumers to enhance their vocal output to their "audience" on the other end of their mobile phones. Mobile phone users suffer from not knowing how well or poorly their own microphone position, their volume or ambient noise are affecting the quality of their communication with parties on the other line (human or machine: i.e. phone calls, or to IVR systems, voice recognition systems from many customer services solutions, as well as voice commands, and voice to text dictation, and so forth,) which causes annoyance at best, and miscommunication at worst. Without proper vocal feedback, it is very hard to adjust one's microphone, pitch and volume to provide accurate and clean voice signal. The next generation of voice and speech technology requires clean and accurate voice commands and thus requires vocal feedback on standard headsets.

For language education, one of the most important things for accurate pronunciation and tone control is the ability to have real-time feedback of one's vocals. This invention allows for accurate feedback, which helps the learner control its pitch and learn better.

For leisure and entertainment, we all have seen how popular Karaoke has become. The added benefit of this invention provides everyone with portable music player with a personal Karaoke device.

Prior art headsets or headphones are typically used in connection with communication and multimedia devices in order to listen to audio signals produced by or transferred from these devices. Examples of such communication and multimedia devices include mobile phones, radio receivers, portable music players like CD players and MP3 players. None of the prior art headsets provide vocal feedback in real time or vocal command.

There are headsets with a microphone that can be turned on to hear ambient noise better while music is playing, but they are not intended for vocal feedback of the user. There are even noise cancellation headphones with microphones to pick up and cancel ambient noise, but none for picking up vocals and enhancing the vocal sounds. There are professional musician wireless feedback systems for vocal feedback, but none are self-contained single board headsets that can be used with mobile phones. They do not control mobile phones and MP3 players to play, track forward and backward, answer phone calls, hang up, or send vocal commands to mobile phones. These systems are built on separate circuit boards and are combined with separate transceivers that go to a mixing board or an alternative source, and then via a transceiver back to the earpiece. Therefore, they are not designed for this invention's intended purpose.

This invention is also unique in its form factor, in that it is completely wearable around the back of the neck as the support structure with ear phones that extend to the ears. Other wireless headsets typically fit around the ear, or are worn over the head, or around the back of the head. No wireless headsets today are worn on the neck which provides stability, support, comfort, and is ideal for the mobile professional or for many forms of exercises such as jogging, skiing, biking and exercise class instruction, among others.

Figure 2:
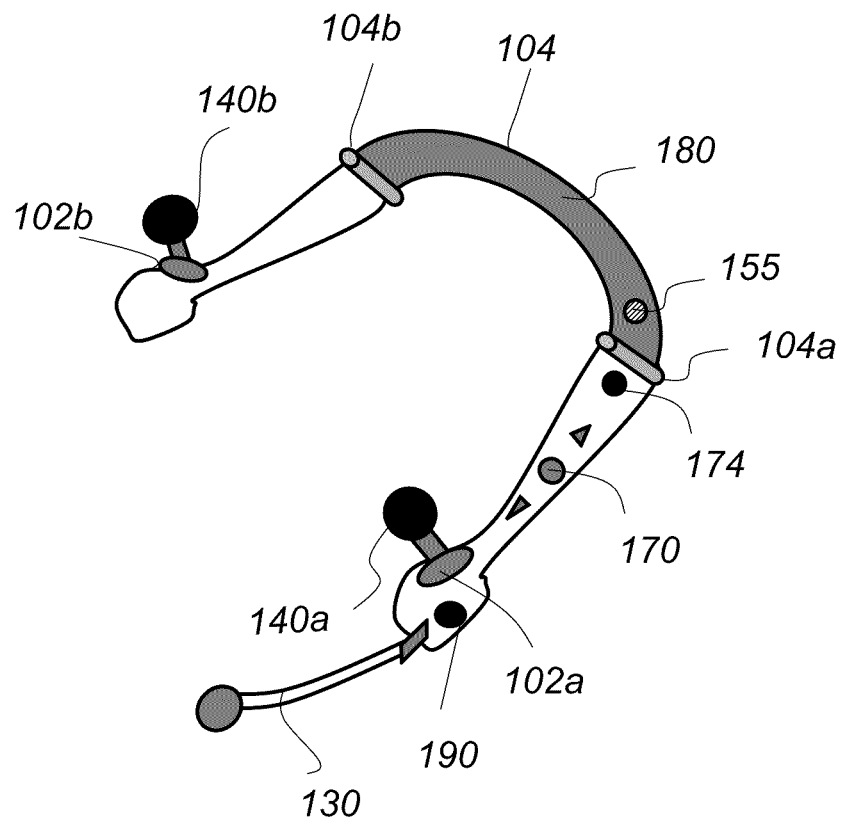
FIG. 2 is a schematic diagram of the headset of FIG. 1.

Referring to FIG. 1 and FIG. 2 a wireless headset 100 is designed to be worn by a user around the back of the neck 50. The headset 100 includes a U-shaped frame 104 that conforms to the user's neck, a digital signal processing unit 180, a vocal command switch 190 and a microphone 130 extending from one end 102a of the U-shaped frame 104, as shown in FIG. 2. The frame 104 is bendable, flexible and adjustable for various neck sizes. The frame 104 is also foldable in two locations 104a, 104b, shown in FIG. 2. The ends 102a, 102b of the U-shaped frame 104 are shaped to house two earphones 140a, 140b, respectively. The earphones 140a, 140b are extended via wires 106a, 106b (not shown) from the ends 102a, 102b, respectively, so that they reach the user's ears and be inserted into the user's ears, as shown in FIG. 1. When not in use, the wires 106a, 106b (not shown) are retracted back into the ends 102a, 102b, respectively, to allow for storing of the ear phones. In some embodiments, there is only one earphone extending from one end of frame 102b and the microphone 130 extends from the other end 102a of the frame. The microphone 130 can also be extended, retracted and positioned by the user for better vocal pick up. In other embodiments the microphone 130 extends from one of the two ear phones 140a, 140b. The on/off vocal command switch 190 is used for initiating the vocal command mode of the headset.

Figure 3:
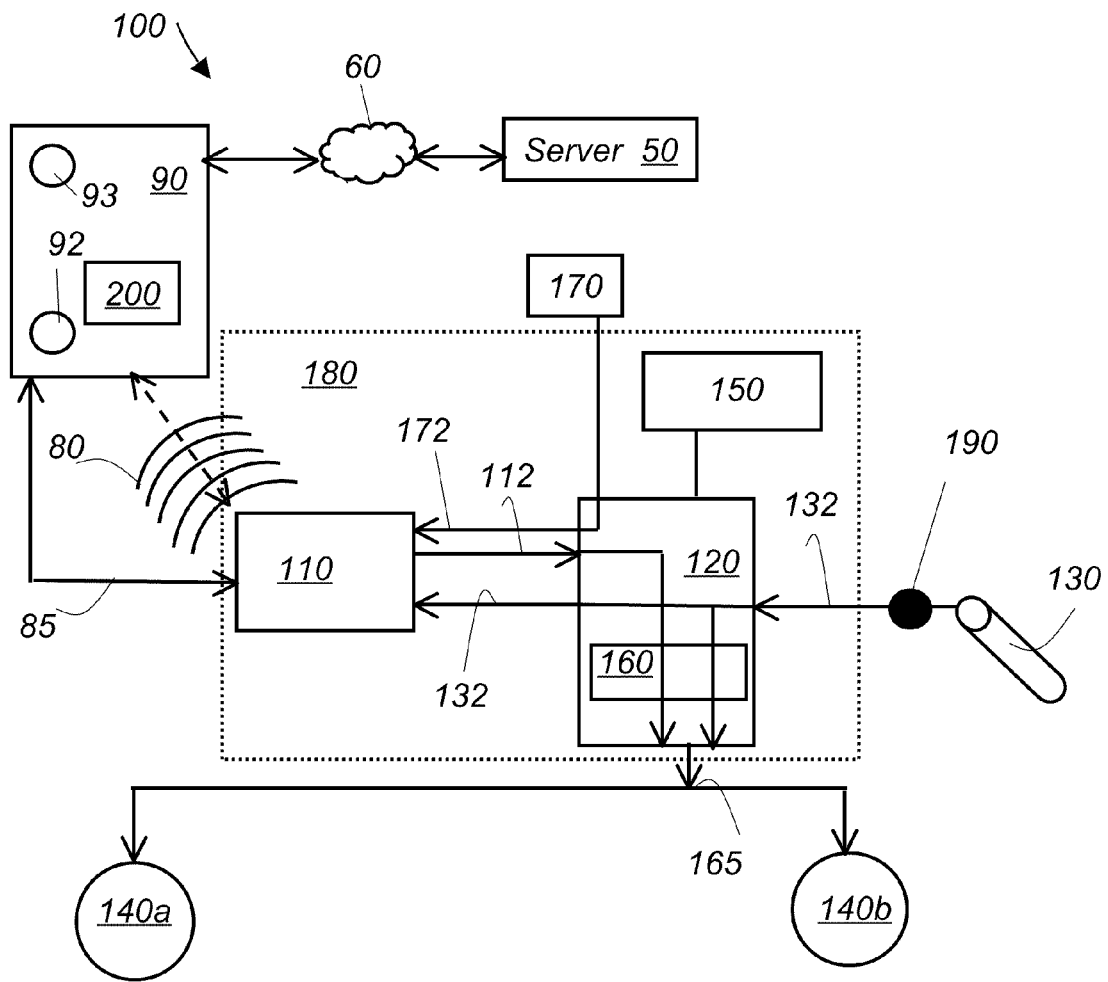
FIG. 3 depicts a schematic circuit diagram of the headset of FIG. 2.

Referring to FIG. 3, signal processing unit 180 includes an interface 110, a signal processor 120 a battery 150 and a mixer 160. Mixer 160 may be separate from the signal processor 120 or incorporated within the signal processor 120, as shown in FIG. 3. During operation, the headset 100 establishes a wireless communication link 80 via the interface 110 with the communication/multimedia device 90. There may also be a wired communication link 85 between the headset 100 and the communication/multimedia device 90 using standard jacks. Data transmitted from the communication/multimedia device 90 are received by the interface 110 and are processed further by the processor 120 in order to generate audio output signals 112, which are then transferred to the earphones 140a, 140b. In one example, interface 110 is a Bluetooth interface and processor 120 is a digital signal processor (DSP). Further, vocal signals 132 obtained by the microphone 130 are processed by the processor 120 as audio signals and then are forwarded to the interface 110. The signal processing by processor 120 includes special filtering to enhance the vocal frequencies of the user. These vocal frequencies are usually in the range between 200 Hz to 5 KHZ. This signal enhancement dramatically reduces ambient noises that are non-vocal, including wind, low frequencies and higher frequencies not associated with the user's vocals. Interface 110 transmits the enhanced audio signal 132 wirelessly to the communication/multimedia device 90. In this way, a two-way communication is established, i.e., the user of the headphone 110 is able to listen to audio signals received from the communication/multimedia device 90 and to forward audio signals to the communication/multimedia device 90. Audio signals 132 are also forwarded to a mixer 160 where they are mixed with the audio signals 112 from the communication/multimedia device 90. The mixed signal 165 is then forwarded to the earphones 140a, 140b. In this way the user receives an audio feedback signal 132 directly from the microphone 130 simultaneously with the audio signal 112 from the communication device 90. This allows the headset 100 to function as a vocal feedback system for more accurate communication with humans or machines via mobile computing and communication devices, and also to function as a karaoke system, whereby the user listens to his own voice when he signs along with a music signal from the communication/multimedia device 90. In other examples, the user uses the headset 100 to listen to his own voice when he pronounces words or sentences for foreign language training or pronunciation improvement. Battery 150 provides the power for the wireless operation of the headset 100. In one example battery 150 is a long life rechargeable battery and the headset includes an input 155 that is used to connect an external power supply to the headset for recharging the battery.

Figure 4:
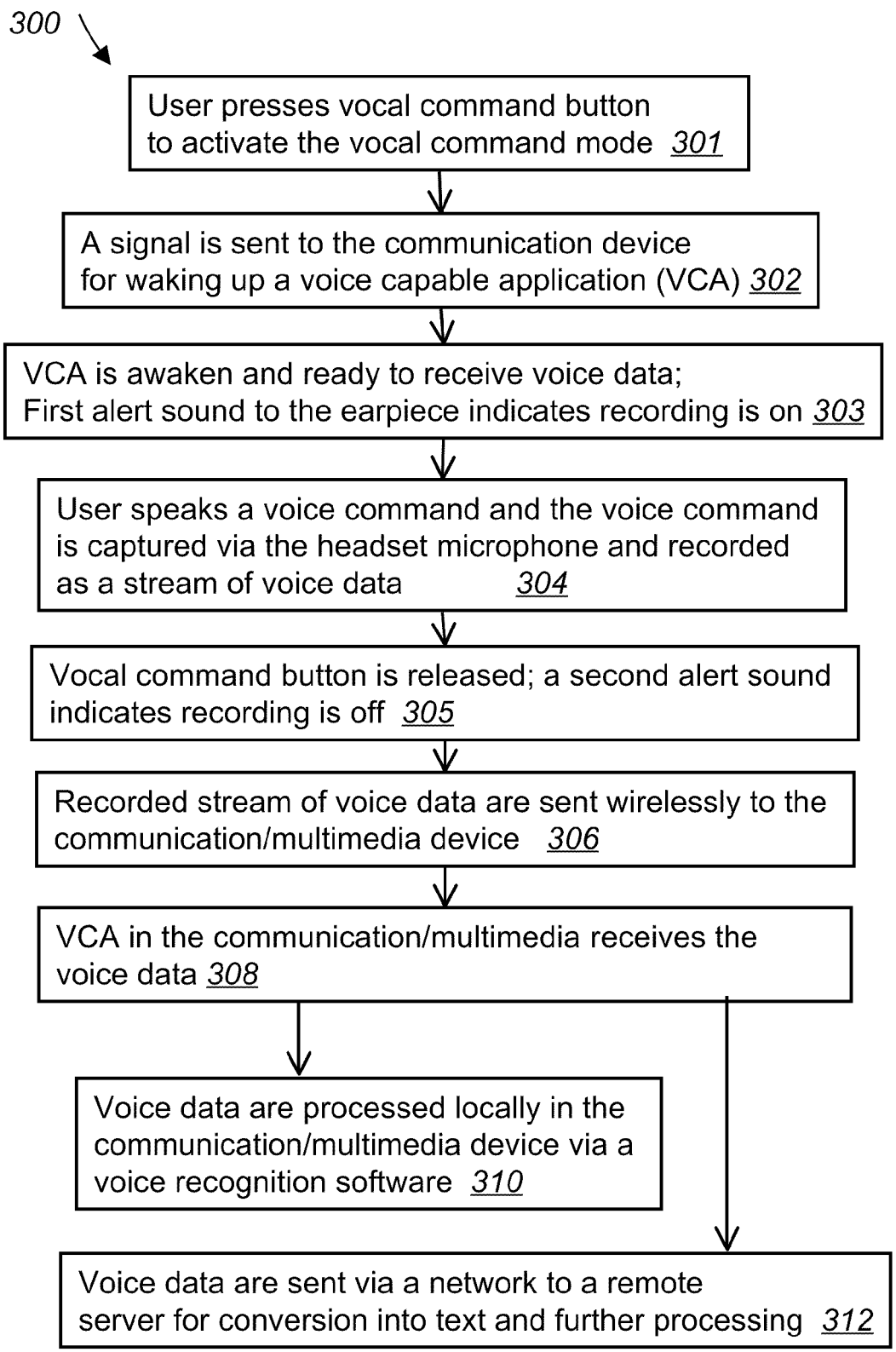
FIG. 4 depicts the vocal command process diagram.

Referring to FIG. 4, the process 300 of utilizing headset 100 for issuing vocal commands to the communication device 90 includes the following. First, the user presses the vocal command button 190 to activate the vocal command mode from the headset 100 (301). At the same time a signal is sent to the communication/multimedia device 90 via the Bluetooth interface 110 for waking up a specific voice capable application (VCA) 200 (302). Application 200 wakes up and is ready to receive voice data. A first alert tone sounds in the ear pieces 140a and 140b to alert the user that it is recording (303). The user speaks a command (or dictation) and the command/dictation is captured via the microphone 130 and recorded as a stream of voice data by the DSP 180 (304). Next, the vocal command button is released and the recording stops. A second (different) alert tone sounds in the ear pieces indicating that the recording stopped (305). The recorded stream of voice data is sent wirelessly to communication/multimedia device 90 via the Bluetooth interface 110 (306). Communication/multimedia device 90 receives the stream of voice data and directs it to the specific VCA 200 involved in fulfilling the issued voice command. Application 200 accepts the voice data and processes the data (308). In one embodiment the data are processed locally in the communication/multimedia device 90 via a local voice recognition application which converts the voice into text or pattern and returns it back to application 200 (310). In another embodiment the data are sent to a remote server 50 via a network connection 60 and processed remotely by the server (312), as shown in FIG. 3. In other embodiments, application 200 is included in the headset 100.

In another embodiment, the voice stream data are passed to an authentication server, which identifies and matches the user's voice patterns for authentication, and thus allowing an application or data to be used by the user, or a transaction to be processed.

In another embodiment the user initiates the vocal command mode by pressing a button 92 on the communication/multimedia device 90 which causes the same sequence of events as described above. Button 92 may be a physical button or a soft button on a touch screen in the application. When the button 92 is pressed an alert sound is transmitted to the ear pieces and recording starts. The captured voice data are streamed or sent as a file to application 200. Upon completion of the recording, the button 92 is released, an alert sound is sent to the ear pieces and the recording stops.

As was described above, pressing the vocal command button 190 causes a signal to be sent to the mobile phone 90 and activates application 200 so that it is ready to receive a voice command. A signal is sent back to the headset device 100 to alert that it is "Ready to Listen". The user speaks and the voice command is captured in an audio file which is then sent to application 200. Application 200 then sends the audio file to a server 50 for voice recognition. The recognized command returns back to application 200 where it is interpreted. Subsequently an action is taken by the application. Examples of voice commands and follow-up actions include the following:

1) "Call John Smith"—the application dials John Smith's number in the phone contact list.
2) "Email or Text John Smith, Subject Meeting Tomorrow"—the application initiates an email application, fills in the contact email address and subject heading, and then waits to do Voice To Text for the rest of the email.
3) "Search Sushi Restaurant Downtown Boston" the application initiates Yahoo One Search or other browser and searches for results.

The user may control the mobile device via additional control buttons 93 located on the device 90 or via control buttons 170 integrated in the headset 100, as shown in FIG. 1. Controls 170 include volume, on/off of vocal feedback, on/off of headset, on/off of mobile device, pairing of devices (Bluetooth), play, pause, stop, forward, fast forward and reverse songs on music player, track search, skip, answering phone calls, hanging up phone calls, among others. The control signals are sent to the signal processor 120 then to the interface 110 via 172, and out to the mobile device 90 via wired link 85 or wireless link 80. The device may also include power and operation indication lights 174.

Other embodiments of the headset include one or more of the following. The U-shaped frame 104 may be foldable in one or more than two locations. The frame may also include electronic circuitry to allow for the various size adjustments. Frame 104 may have an ergonomic design and may be supported on top of the user's head 50, around the back of his head, around and/or on top of the ears. The headset may include a memory for storing music or other information. Signal mixer 160 may also be part of the DSP 120. The communication/multimedia device 90 may be an MP3 player, iphone, ipod, PDA, mobile phone, personal computer, television set, or any other wireless or wired multimedia device. The microphone 130 may be a high quality microphone and the headset may be stereo or mono headset. In one example the microphone is a 4 mm microphone with a pre-amplifier. The wireless interface may be Bluetooth hands-free, Bluetooth A2DP (stereo music), Bluetooth AVRCP (stereo gaming), infrared, or any other wireless format. In one example the wireless interface is a BlueCore7 provided by Cambridge Silicon Radio (CSR) of Cambridge, UK. The headset may include digital encryption for secure conversations. The communication/multimedia device may be incorporated within the headset. The microphone may be telescopic, rotatable, and/or detachable Several embodiments of the present invention have been described. Nevertheless, it will be understood that various modifications may be made without departing from the spirit and scope of the invention. Accordingly, other embodiments are within the scope of the following claims.

What is claimed is:

1. A headset comprising:
a wearable body;
first and second earphones extending from said wearable body;
controls for controlling an external communication/multimedia device wirelessly;
a microphone for picking up voice data from a user of the headset;
a signal processing unit comprising, circuitry for processing said voice data into a distinctly audible vocal feedback signal, circuitry for enhancing said vocal feedback signal thereby producing an enhanced vocal feedback signal, circuitry for mixing said enhanced vocal feedback signal with audio signals originating from said external communication/multimedia device, thereby producing a mixed output signal and then sending the mixed output signal to said user via said earphones;
wherein said external communication/multimedia device comprises a vocal command application and wherein said headset further comprises a vocal command control for sending vocal commands to said external communication/multimedia device and to said vocal command application;
wherein said vocal command control sends a vocal command activation signal from said headset to said external communication/multimedia device, wakes up said vocal command application, records and sends voice data to said vocal command application via an interface, and wherein said vocal command application converts said voice data into text or pattern, locally or remotely via a server, and wherein the vocal command application further translates said text or pattern into commands that perform one or more functions by said vocal command application and other applications on said external communication/multimedia device; and
a recorder for recording voice data and wherein upon starting of a recording, a first alert tone is sent to said earphones indicating that recording of voice data has commenced and wherein upon stopping of a recording, a second alert tone is sent to said earphones indicating that the recording is stopped.

2. The headset of claim 1 wherein said wearable body is configured to be worn around the back of said user's neck and comprises bendable and flexible material.

3. The headset of claim 2 wherein said wearable body comprises a U-shaped frame that conforms to the back of said user's neck and comprises first and second ends and wherein said microphone extends from one of said U-shaped frame ends.

4. The headset of claim 3 wherein said U-shaped frame is foldable and comprises adjustable length.

5. The headset of claim 3 wherein said first and second earphones are contained and concealed within first and second openings in said first and second ends of said U-shaped frame, respectively, and wherein said earphones are pulled out from said openings when in use and retract back into said openings when not in use.

6. The headset of claim 3 wherein said signal processing unit is contained within said U-shaped frame and comprises the interface, a signal processor, filters, a mixer, a battery and a recorder, and wherein during operation said headset communicates with and sends and receives data to and from said external communication/multimedia device via said interface.

7. The headset of claim 6 wherein said interface comprises a wireless interface.

8. The headset of claim 7 wherein said wireless interface comprises a Bluetooth interface 9. The headset of claim 1 wherein said external communication/multimedia device comprises one of mobile phone, MP3 player, portable music player, personal digital assistant, personal computer, or television set.

10. The headset of claim 1 wherein said enhancement circuitry comprises filters for enhancing said user's vocal frequencies and controls for adjusting the volume of said enhanced vocal feedback signal relative to the volume of the audio signals originating from said communication/multimedia device.

11. The headset of claim 1 wherein said communication/multimedia device communicates with and sends said vocal commands voice data to a remote server via a network and wherein said server converts voice data contained in said vocal commands into text or pattern and then returns said text or pattern back to said vocal command application for executing commands translated from said text or pattern.

12. The headset of claim 1 wherein said external communication/multimedia device further comprises a voice recognition application and said voice recognition application receives voice data from said headset and converts them into text or pattern and wherein said vocal command application translates said text or pattern into commands that perform one or more functions by said vocal command application and other applications on said external communication/multimedia device.

13. The of headset claim 11 wherein said remote server comprises an authentication application for recognizing and authenticating said user from said voice data.

14. The headset of claim 1 wherein said vocal commands comprise one of "call a person", "e-mail a person", "search a content", "text a person" or "Goto a location" based on GPS.

15. A method for issuing vocal commands to a communication/multimedia device via a headset comprising:
providing a headset comprising a wearable body, first and second ear phones extending from said wearable body, controls for controlling the external communication/multimedia device wirelessly, a microphone for picking up voice data from a user of the headset, a signal processing unit for processing said voice data and a vocal command control for sending said voice data to the communication/multimedia device;
activating said communication/multimedia device's vocal command mode by turning said vocal command control on;
sending a wake-up signal to said communication/multimedia device via an interface of said headset for waking up a vocal command application and begin recording of vocal command voice data;
sending a first alert sound to said earphones indicating that recording of voice data has commenced;
speaking vocal commands into said microphone and recording the captured voice data;
releasing said vocal command control, thereby stopping the recording of the captured voice data;
sending a second alert sound to said earphones indicating that recording of voice data has stopped;
sending said recorded voice data to said communication/multimedia device and to the vocal command application;
converting said voice data into text or pattern, locally or remotely via a server; and
translating said text or pattern into commands that perform one or more functions by said vocal command application and other applications on said external communication/multimedia device.

16. The method of claim 15 wherein said signal processing unit processes said voice data into a vocal feedback signal, enhances said vocal feedback signal thereby producing an enhanced vocal feedback signal, mixes said enhanced vocal feedback signal with audio signals originating from said external communications/multimedia device, thereby producing a mixed output signal and then sends the mixed output signal to said user via said earphones, and to a recorder for recording voice data.

* * * * *